United States Patent
Gong

(10) Patent No.: US 7,269,558 B2
(45) Date of Patent: Sep. 11, 2007

(54) DECODING MULTIPLE HMM SETS USING A SINGLE SENTENCE GRAMMAR

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 552 days.

(21) Appl. No.: 09/915,911

(22) Filed: Jul. 26, 2001

(65) Prior Publication Data

US 2002/0042710 A1    Apr. 11, 2002

Related U.S. Application Data

(60) Provisional application No. 60/221,920, filed on Jul. 31, 2000.

(51) Int. Cl.
*G10L 15/14* (2006.01)
(52) U.S. Cl. ............... 704/256.2; 704/256; 704/240; 704/231
(58) Field of Classification Search ........ 704/255–257, 704/231, 232, 251, 240–243
See application file for complete search history.

(56) References Cited

U.S. PATENT DOCUMENTS

| | | | |
|---|---|---|---|
| 5,333,275 A * | 7/1994 | Wheatley et al. ........... | 704/243 |
| 5,806,034 A * | 9/1998 | Naylor et al. ............... | 704/256 |
| 5,819,221 A * | 10/1998 | Kondo et al. ............... | 704/255 |
| 6,055,498 A * | 4/2000 | Neumeyer et al. .......... | 704/246 |
| 6,076,057 A * | 6/2000 | Narayanan et al. ......... | 704/256 |
| 6,226,611 B1 * | 5/2001 | Neumeyer et al. .......... | 704/246 |
| 6,285,981 B1 * | 9/2001 | Kao ........................... | 704/256 |

OTHER PUBLICATIONS

Imperl, Bojan: "Multilingual Connected Digits and Naural Numbers Recognition in the Telephone Speech Dialog Systems"; Proceedings of the IEEE International Symposium on Industrial Electronics; Jul. 1999, pp. 188-189.
Korkmazskiy, Filipp et al.; "Generalized Mixture of HMMS for Continuous Speech Recognition"; 1997 IEEE International Conference on Acoustics, Speech and Signal Processing; Apr. 1997, pp. 1443-1446.
Gong, Yifan et al.; "Parallel Construction of Syntactic Structure for Continuous Speech Recognition", Proceedings of the European Conference on Speech Communication and Technology, Sep. 1989, pp. 47-50.

* cited by examiner

*Primary Examiner*—Vijay Chawan
(74) *Attorney, Agent, or Firm*—W. James Brady; Frederick J. Telecky, Jr.

(57) ABSTRACT

For a given sentence grammar, speech recognizers are often required to decode M sets of HMMs each of which models a specific acoustic environment. In order to match input acoustic observations to each of the environments, typically recognition search methods require a network of M sub-networks. A new speech recognition search method is described here, which needs that is only the size of a single sub-network and yet gives the same recognition performance, thus reducing memory requirement for network storage by $(M-1)/M$.

15 Claims, 1 Drawing Sheet

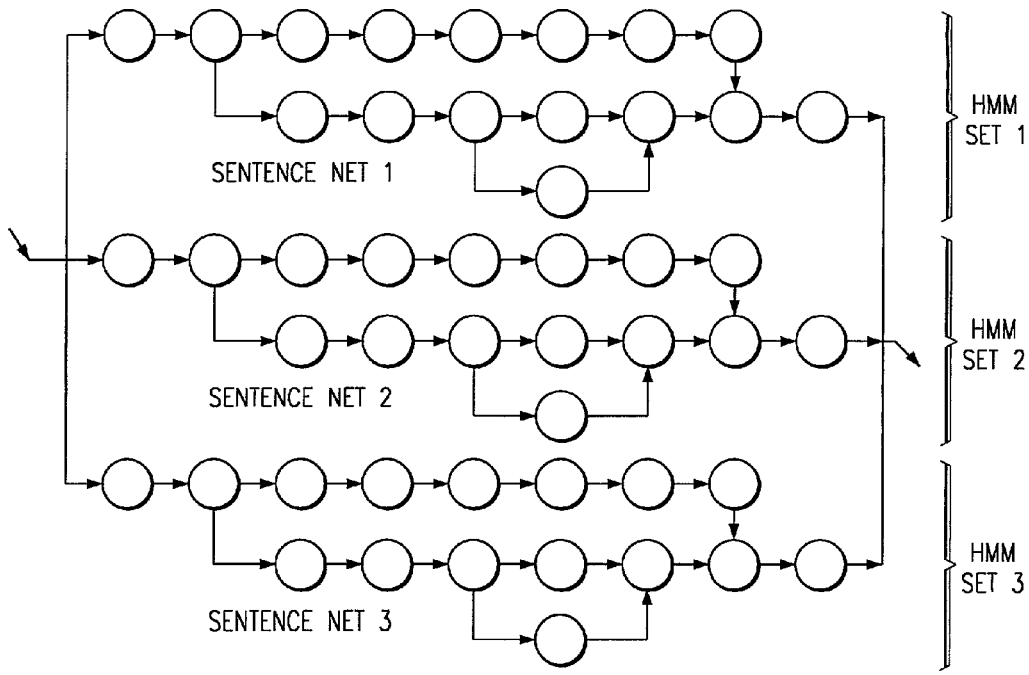
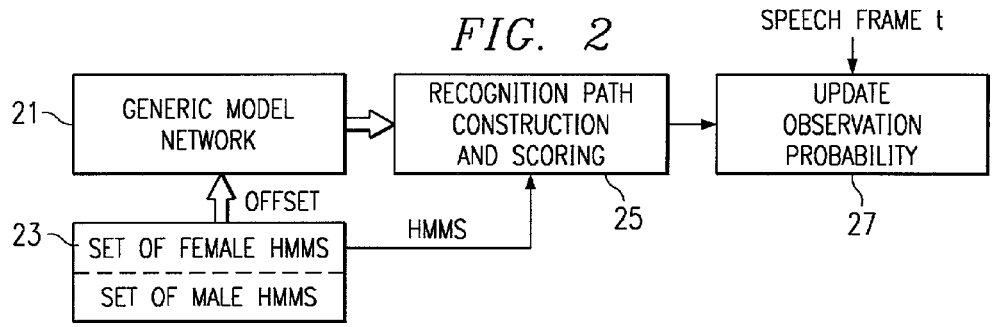
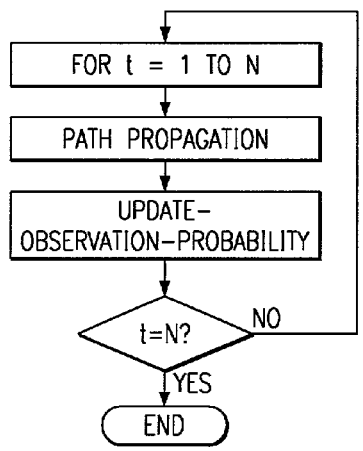

DECODING MULTIPLE HMM SETS USING A SINGLE SENTENCE GRAMMAR

This application claims priority under 35 USC § 119(e)(1) of provisional application No. 60/221,920 filed Jul. 31, 2000.

FIELD OF INVENTION

This invention relates to speech recognition and more particularly to a speech recognition search method.

BACKGROUND OF INVENTION

Speech recognition devices are typically deployed in different acoustic environments. An acoustic environment refers to a stationary condition in which the speech is produced. For instance, speech signal can be produced by male speakers, female speakers, in office environment, in noisy environment.

A common way of dealing with multiple environment speech recognition is to train a sets of models such as Hidden Markov Models (HMM) for each environment. Each set of HMMs will have the same number of models representing the same sounds or words spoken in the environment corresponding to the HMM set. Typically, a speech recognizer utilizes a grammar network which specifies the sequence of HMMs that correspond to the particular speech sounds and words making up the allowable sentences. In order to handle the sets of HMMs for each environment, current art technology provides the speech recognizer with a large grammar network which contains a grammar sub-network for each HMM set according to each of the environments. These sub-networks enable the use of each HMM sets within the recognizer. Since the HMM sequences corresponding to sentences allowed by the grammar network generally do not change with environment each grammar sub-network has the same structure. For example, there would be a pronunciation set or network of HMMs (grammars) for male speakers and a set of HMMs for female speakers because the sounds or models for a male speaker are different from a female speaker. At the recognition phase, HMMs of all environments are decoded and the recognition result of the environment giving the maximum likelihood is considered as final results. Such a practice is very efficient in recognition performance. For example, if male/female separate models are not used, with the same amount of HMM parameters, the Word Error Rate (WER) will typically increase 70%.

More specifically, for a given sentence grammar network, the speech recognizer is required to develop high probability paths for M (the number of environments) sub-networks, referencing M sets of HMMs, each of which models a specific acoustic environment. In order to perform acoustic matching with each of the environments, present art recognition search methods typically (which include state-of-the-art recognizers as HTK 2.0) require a grammar network consisting of M sub-networks, as illustrated in FIG. 1. Requiring M sub-networks makes the recognition device more costly and requires much more memory.

SUMMARY OF INVENTION

A new speech recognition search method is described here, wherein the speech recognizer only requires a grammar network having the size of a genetic base sub-network that represents all of the M sub-networks and yet gives the same recognition performance, thus reducing the memory requirement for grammar network storage by (M−1)/M. The speech recognition method includes a generic base independent grammar network specified using a set of independent base symbols and sets of expanded symbols referencing the models of each of environment-dependent models sets such as a male and female set. The new speech recognizer builds recognition paths by expanding the symbols of the base grammar network through proper conversion function that gives for each of the base grammar network symbols, an enumeration of an expanded set of symbols and the dependent models referenced by the expanded symbols, and vice versa. That is, it can provide, for one of the symbols of the expanded set of symbols, the base symbol to which it corresponds.

DESCRIPTION OF DRAWING

In the drawing:

FIG. 1 illustrates conventional recognizer grammar network that requires multiple sub-networks to recognize multiple environment-dependent model sets;

FIG. 2 illustrates a block diagram of the speech recognition path probability scoring process according to one embodiment of the present invention; and FIG. 3 illustrates the main loop procedure of the speech recognition path probability scoring process.

DESCRIPTION OF PREFERRED EMBODIMENT

In the present application we refer to a node in the grammar network describing the allowed sentences as a symbol which references a particular HMM or a group of M HMMs, one from each of the M HMM sets. For typical recognizers, when M sets of the HMMs are used, then M sub-networks must be in the grammar network, with M sub-networks corresponding to the M environments. This is illustrated in FIG. 1, where for three HMM sets there are three sub-networks of nodes.

In accordance with the present invention, a generic base grammar network is constructed to represent a merged version of the M networks that is speaker independent. For the male and female case this would be a merged version of the male and female networks and be gender-independent. The models for children may also be merged. Other environments may also be merged. We need to further decode specific HMMs such as those for the male, female and child and combine with the generic base grammar (speaker independent) network where for male, female and child have the same nodes and transitions.

In applicant's method of decoding M HMM sets, two types of symbols are distinguished:

Base-symbols ($\alpha$): Symbols representing the nodes of the generic base grammar network (i.e., the network before duplication for M-sets HMM). To each of the base-symbols there correspond M expanded-symbols which represent the symbols of conceptual sub-networks. They (base symbols and base network) have physical memory space for storage. This is generic (speaker independent) representing the nodes and transitions.

Expanded-symbols ($\tilde{\alpha}$): Symbols representing the expended grammar network nodes that reference the HMMs from each HMM set. The expanded-symbols are used to construct a conceptual expanded grammar network that simulates the characteristics of an M sub-network grammar. Their existence in the grammar network is conceptual and does not require storage for symbol information, grammar nodes or transitions. The expanded-symbols may reference, for example, HMMs from the male and female sets.

For each base-symbol in the base grammar network there are M corresponding expanded-symbols. The new recognizer builds recognition paths defined on the expanded-symbols, and accesses the network using base-symbols, through proper conversion function that gives the base-symbol of any expanded symbol or the expanded-symbols for a given base-symbol.

Referring to FIG. 2 there is illustrated the speech recognition path construction and path probability scoring process according to one embodiment of the present invention. For the male and female combined case the generic base grammar network represented by the base symbols α is stored in memory 21. This provides the network structure itself. Also stored in memory 23 is a set of HMMs for male and a set for female for example. A set of HMMs may also be for child. As is well known in the art, speech recognizers process short sequential portions of speech, referred to as frames. Also known in the art, for each incoming speech frame, the speech recognizer must determine which HMMs should be used to construct high probability paths through the grammer network. The base symbol contains the sentence structure. The process is to identify the HMM to be used. For every incoming speech frame a main loop program performs a recognition path construction and update-observation-probability. The main loop program (see FIG. 3) includes a path-propagation program 25 and an update-observation-probability program 27. The speech path construction and the scoring process 25 uses the base grammar network and base-symbol information in memory 21, the HMM model set information in memory 23, and conversion function to identify the expanded symbols to be used to construct the recognition paths through the conceptual expanded network. After the path construction is accomplished the recognizer updates the observation probability 27 of each of the conceptual expanded grammar network paths.

The function MAIN-LOOP program illustrated in FIG. 3 performs recognition path construction for every incoming speech frame:

---

MAIN-LOOP (networks, hmms):
Begin
    For t = 1 to N Do
    Begin
        PATH-PROPAGATION (network, hmms, t);
        UPDATE-OBSERVATION-PROB (network, hmms, t);
    End
End

--- where t indicates the time index of each speech frame, N is the number of frames in the spoken utterance, network represents the generic base grammar network, and hmms represents an ordered listing of all HMMs in the M HMM sets.

The MAIN_LOOP procedure illustrated in FIG. 3 performs recognition path construction for each incoming speech frame. The MAIN_LOOP procedure includes the path construction (FIG. 2, 25) and the update-observation-probability procedure (FIG. 2, 27). After the speech recognizer performs the MAIN-LOOP procedure for all utterance frames, the recognizer then selects the single remaining path that had the highest final probability as the path containing the recognized utterance.

Since speech frames associated with paths through each expanded-symbol are further associated with a sequence of HMM states of the HMM referenced by the expanded-symbol, paths through the conceptual expanded grammar network consist of a sequence of both expanded-symbols and HMM states. Consequently, for a given utterance frame a path can be extended either within the presently active HMM referred by an active expanded-symbol using within-model-path or another expanded-symbol and its referenced HMM using a cross-model-path, which the decoding procedure constructs for each symbol:

---

PATH-PROPAGATION (network, hmms, t):
Begin
    For each active ã at frame t − 1 Do
    Begin
        ($\Delta_{hmm}$, $\Delta_{sym}$, α) = get-offsets (ã, network);
        hmm = hmms[hmm-code(symbol-list(network)[α]) + $\Delta_{hmm}$];
        WITHIN-MODEL-PATH (hmm, · $t'_{-1}$, $t'$);
        CROSS-MODEL-PATH (hmms, network, ã, α, $\Delta_{hmm}$, $\Delta_{sym}$, t, score ($t'_{-1}$, EXIT-STATE));
    End
End

--- where:

$p_t^s$ denotes the storage of path information for the expanded-symbol s at frame t.

"get-offsets" gives the offset of HMM ($\Delta_{hmm}$), offset of symbol ($\Delta_{sym}$) and the base-symbol (α), given ã and a network.

"symbol-list" returns the list of symbols of a network.

"hmm-code" gives index of an hmm, associated to a symbol.

Score (p, i) gives the score at state i of the symbol storage p. We keep what is the symbol and frame from which we are from t to t−1 and trace the sequence of the word. The nodes are constructed based on the model.

The PATH-PROPAGATION procedure first determines the HMM and base-symbol corresponding to each active expanded-symbol. In order to determine the HMM corresponding to each active expanded-symbol, the recognizer uses a conversion function, ("get offsets"), which provides a parameter ($\Delta_{hmm}$) which can be used to determine the HMM corresponding to the expanded-symbol, and also determines the generic base grammar network base-symbol α in 21 corresponding to the extended-symbol. These are used to access tables consisting of a base-symbol table (symbol_list (network)), an Hmm table for each HMM set and an ordered hmm, via the base symbol α to determine the group of extended-symbols corresponding to the base-symbol. Finally, the parameter ($\Delta_{hmm}$) is used to access a list of HMMs to retrieve the HMM corresponding to the active expanded-symbol. In the search algorithm for each frame time interval 1 to N for frame time t looks back at time t−1 and calculates to find out the base symbol. See FIG. 2. From this to access the generic network 21 given the expanded symbol ã to get the offset of HMM ($\Delta_{hmm}$). Once the ΔHMM is determined, the HMM memory 23 can be accessed such that the HMM that corresponds to the male base or female is provided. Once the HMM is obtained the sequence of states within model path is determined and then the cross model path. The sequence of HMM states is constructed in the recognition path construction 25 in both the within HMM path and the between models. There are therefore two key functions for decoding, within-model-path construction and cross-model-path construction. The PATH- PROPAGATION procedure then extends the path of the active expanded-symbol with the referenced using th WITHIN-MODEL-PROCEDURE:

```
WITHIN-MODEL-PATH (hmm, p_{t-1}, p_t);
Begin
    For each HMM state i of hmm Do
    Begin
        For each HMM state j of hmm Do
        Begin
            score (p_t,j) = score (p_{t-1}, i) + a_{ij};
            from-frame (p_t,j) = from-frame (p_{t-1}, i)
            from-symbol (p_t,j) = from-symbol (p_{t-1}, i)
        End
    End
End
``` where:

$\alpha_{ij}$ is the transition probability from state i to state j. "from-frame" expands the frame path information in p and "from-symbol" expands the symbol path information in p. The WITHIN-MODEL PATH procedure determines which states of an active HMM can be extended from frame t−1 to frame t, and then extends the path information in $p_{t1}$-storing the extended information in pt corresponding to $\tilde{\alpha}$.

When we do the within HMM path, we need to do the storage of t and t−1. That sentence with the highest score is determined based on the highest transition log probability. This is done for every state in the HMM. For each state j in the equation below. Once we arrive at the end we go back and find out what is the sequence of the symbols that has been recognized. This is stored.

After PATH-PROPAGATION extends the paths within extended-symbol HMMs, it determines if the path can be extended to other HMMs references by other expanded-symbols using the CROSS-MODEL-PATH procedure.

```
CROSS-MODEL-PATH (hmms, network, ã, α Δ_{hmm}, Δ_{sym},
                  t, *i);
Begin
    For each next symbol s of αDo
    Begin
        hmm = hmms [hmm-code(symbol-list(network)[s]) + Δ_{hmm}];
        For each HMM initial state j of hmm Do
        Begin
            score (pẽ,j) = *i × π (j);
            from-frame (pẽ,j) = t − 1;
            from-symbol (pẽ,j) = ã;
        End
    End
End
``` where "hmm" is the HMM referenced by the expanded-symbol ẽ coming from the same HMM set as expanded-symbol $\tilde{\alpha}$ corresponding to the base-symbol e; δ is the path probability of the path exiting the HMM referenced by expanded-symbol $\tilde{\alpha}$; π(j) is the entry probability of HMM "hmm" state j; and $p^{\tilde{e}}$ represents the path storage information for the expanded-symbol ẽ.

CROSS-MODEL-PATH extends the path from the HMM referenced by expanded-symbol $\tilde{\alpha}$ to each HMM referenced by expanded-symbol ẽ subject to the constraint of the base grammar network allowing the expansion to the new HMM. Note that the CROSS-Model-PATH procedure ensures that extension of the path will only occur within an HMM set, via the $\Delta_{hmm}$ parameter and a set of tables consisting of the base-symbol table, an hmm table for each HMM set and an ordered hmm list, so that the recognizer correctly conceptually separates the paths to simulate the M sub-networks.

For the cross model path we need for the next symbol s of α we need to consider all possible next symbols s. This is the true symbol s (knowledge of grammar that tells which symbol follows which symbol). We determine it's initial state or first HMM and we perform the sequence of HMM states for between states and add the transition probability (log probability) from one state to another. We use the π symbol for outside the states. We go back to the beginning and determine what is the symbol and frame from which we are from so that at the end we can go back and check the sequence of words. By doing this within and between we have constructed all the nodes.

Finally, once the MAIN-LOOP completes path construction for each of the HMM sets according to the base the grammar network, it's path acoustic likelihood score is evaluated by the UPDATE-OBSERVATION-PROB procedure (FIG. 2, 27):

```
UPDATE-OBSERVATION-PROB (newtwork, models, t);
Begin
    For each active ã at frame t Do
    Begin
        (Δ_{hmm}, α) = get-true-symbol (ã, network);
        hmm = hmms[hmm-code(symbol-list(network)[α]) + Δ_{hmm}];
        For each HMM state j of hmm Do
        Begin
            Evaluate score (ẽ,j);
        End
        calculate score for ã;
    End
End
``` where:
"get-true-symbol" returns the base-symbol of a expanded symbol.

In UPDATE-OBSERVATION-PROB the acoustic likelihood is calculated for each state of each HMM for which there is present path information $p_t$. The acoustic likelihood is determined by evaluating the likelihood of the present frame of acoustic given the model information of the HMM state. These are all based on the model. The next step is to look at the speech to validate by comparison with the actual speech. This is done in the update-observation-probability program 27. See FIG. 2. We need to find the HMM and for every HMM state we need to evaluate the score against the storage area at the time for the symbol α. The highest score is used. The best score models are provided.

Results

This new method has been very effective at reducing the memory size. Below represents the generic grammar for 1–7 digit strings:

$digit=(zero|oh|one|two|three|four|five|six|seven|eight|nine) [sil];

$DIG=$digit [$digit[$digit[$digit[$digit[$digit[$digit]]]]]];

$SENT=[sil] $DIG [sil];

It says for we recognize zero or oh or one, or two etc. It also says a digit is composed of a single digit, two digits etc. It also says a sentence is on two etc. digits.

The grammar for the 1–7 digit strings for the old gender dependent way follows:

$digit_m=(zero_m|oh_m|one_m|two_m|three_m|four_m|five_m|six_m|seven_m|eight_m|nine_m)[sil_m];

$DIG=$digit_m[$digit_m[$digit_m[$digit_m[$digit_m[$digit_[$digit_m]]]]]];
$SENT_m=[sil_m]$DIG_m[sil_m];
$digit_f=(zero_f|oh_f|one_f|two_f|three_f|four_f|five_f|six_f|seven_f|eight_f|nine_f)[sil_f];
$DIG_f=$digit_f[$digit_f[$digit_f[$digit_f[$digit_f[$digit_f[$digit_f]]]]]];
$SENT_f=[sil_f]$DIG_f[sil_f];
$S=$SENT_m|$SENT_f;

This is twice the size of the generic grammar.

The purpose is to calibrate resource requirement and verify that the recognition scores are bit-exact with multiple grammar decoder. Tests are based on ten files, 5 male 5 female.

For the grammars above, respectively, a single network grammar of sentence and a multiple (two, one for male, one for female) network grammar of sentence.

Computation Requirement

Due to the conversion between base and expanded symbols, the search method is certainly more complex than the one requiring M-set of networks. To determine how much more computation is needed for the sentence network memory saving, the CPU cycles of top 20 functions are counted, and In are shown in Table 1 (excluding three file I/O functions). It can be seen that the cycle:

TABLE 1

CPU cycle comparison for top time-consuming functions (UltraSPARC-II).

| Item | multiple-grammar | Single-grammar |
|---|---|---|
| allocate_back_cell | 1603752 | 1603752 |
| coloring_beam | 1225323 | 1225323 |
| coloring_pending_states* | 2263190 | 2560475 |
| compact_beam_cells | 2390449 | 2390449 |
| cross_model_path* | 2669081 | 2847944 |
| fetch_back_cell | 10396389 | 10396389 |
| find_beam_index | 7880086 | 7880086 |
| get_back_cell | 735328 | 735328 |
| init_beam_list | 700060 | 700060 |
| logGaussPdf_decode | 19930695 | 19930695 |
| log_gauss_mixture | 2695988 | 2695988 |
| mark_cells | 13794636 | 13794636 |
| next_cell | 898603 | 898603 |
| path_propagation* | 1470878 | 1949576 |
| Setconst | 822822 | 822822 |
| update_obs_prob* | 5231532 | 5513276 |
| within_model_path | 3406688 | 3406688 |

*is introduced to indicate an item that has a changed value.

Consumption for most functions stays the same. Only four functions showed slight changes. Table 2 summarizes cycle consumption and memory usage. The 1.58% is spent on calculating the set-index, and can be further reduced by storing the indices. However, the percent increase is so law that at this time it might not be worth-doing to investigate the other alternative—CPU efficient implementation.

TABLE 2

Comparison of multiple-grammar vs. single-grammar (memory-efficient implementation).

| Item | multiple-grammar | single-grammar | increase |
|---|---|---|---|
| TOP CYCLES | 78115500 | 793520901 | 1.58 |
| NETWORK SIZE | 11728 | 5853 | −50.0. |

The invention claimed is:

1. A speech recognizer for decoding multiple HMM sets using a generic base sentence network comprising: means for decoding HMM sets using the generic base sentence network wherein each HMM set of said HMM sets is a group of HMMs from one environment and a recognizer responsive to input speech for recognizing speech using said decoded multiple HMM sets wherein the means for decoding includes means for building recognition paths defined on expanded symbols and accessing said network using base symbols through a conversion function that gives the base symbol of any expanded symbols, and vice versa.

2. A speech recognition device comprising: a speech recognizer processing device responsive to input speech and HMM sets for recognizing speech and an output device for presenting the recognized speech to a user, said recognizer processing device comprising means for decoding multiple HMM sets using a generic base sentence network wherein each HMM set of said HMM sets is a group of HMMs from one environment comprising the steps of: providing a generic grammar, providing expanded symbols representing a network of expanded HMM sets and building recognition paths defined by the expanded symbols and accessing the generic base sentence network using base symbols through a proper conversion function that gives the base symbol of any expanded symbols, and vice versa.

3. The method of claim 2 wherein said building step includes for each frame path propagation expansion within each expanded HMM set based on the grammar network and update-observation-probability.

4. The method of claim 3 wherein said path propagation includes getting offsets that index each HMM set, retrieving individual expanded symbols for each HMM set that correspond to base symbols within the generic grammar network, and extending a Viterbi search for each expanded symbol for each HMM set individually and separately by obtaining the HMM of the previous frame and expanding and storing a sequence set of HMM states both for within model path and cross model path and determining the path with the best transition probability.

5. The method of claim 2 wherein the processing steps of a main loop, path-propagation, update-observation-probability, within-model path, and cross-model path build extensions to the recognition paths by calculating $\Delta_{hmms}$ in the processing steps get-offsets and get-true-symbols which interface between the generic base network object and the multiple environment HMM sets.

6. In a speech recognition device including a recognizer processing device coupled to receive input speech and HMM sets for recognizing speech and an output device for presenting the recognized speech to a user, a method in said recognizer processing device for decoding multiple HMM sets using a generic base sentence network wherein each HMM set of said HMM sets is a group of HMMs from one environment comprising the steps of: providing a generic network containing base symbols; a plurality of sets of HMMs where each set of HMMs corresponds to a single environmental factor such as for male and female; each said set of HMMs enumerated in terms of expanded symbols which map to the generic network base symbols; accessing said generic network using said base symbols through a conversion function that gives base symbols for expanded symbols to therefore decode multiple HMM sets using a generic base sentence grammar and using said HMM sets to recognize incoming speech.

7. A speech recognizer comprising: an input means for receiving speech, a recognizer processing device recognizing speech using multiple HMM sets and provide output signals representing recognized speech, said recognizer processing device including means for decoding said multiple HMM sets using a generic base sentence network wherein the means for decoding includes means for building recognition paths defined on expanded symbols and accessing said network using base symbols through a conversion function that gives the base symbol of any expanded symbols, and vice versa the processing steps of a main loop, path-propagation, update-observation-probability, within-model path, and cross-model path build extensions to the recognition paths by calculating $\Delta_{hmms}$ in the processing steps get-offsets and get-true-symbols which interface between the generic base network object and the multiple environment HMM sets.

8. A speech recognizer comprising in combination: means for receiving input speech, a recognizer processing device including model sets and means for comparing input speech to said model sets to recognize said input speech and an output device for presenting the recognized speech to a user, said recognizer processing device including means for decoding a plurality of model sets using a generic base grammar network composed of base-symbols wherein each model set of said model sets is a group of models from one environment comprising: means for constructing recognition paths defined on expanded-symbols wherein each expanded-symbol references a model contained in one of the model sets, and means for determining expanded-symbols by a conversion function that maps a base-symbol of the generic base grammar network to a plurality of expanded-symbols and an expanded-symbol to its corresponding base-symbol.

9. The recognizer of claim 8 wherein said recognition path construction includes means for constraining each recognition path to expanded-symbols referencing models within one model set.

10. The recognizer of claim 8 wherein the model sets are HMM model sets.

11. The recognizer of claim 8 wherein the models of each set correspond to a single environmental factor.

12. The recognizer of claim 8 wherein the recognition procedure consists of a recognition path construction procedure and an update observation probability procedure.

13. The recognition path construction procedure of claim 12 wherein construction of recognition paths consists of extending the path, wherein the path defined by a present expanded-symbol and its referenced model is extended within the referenced model by a within-model-path procedure and to additional expanded-symbols by a cross-model-path procedure.

14. The cross-model-path procedure of claim 13 in which the path from a present expanded-symbol is extended to additional expanded-symbols by determining the present base-symbol corresponding to the present expanded-symbol, determining which additional base-symbols may follow the present-base symbol according to the generic base grammar network, and determining the additional expanded-symbols using the conversion function which maps each additional base-symbol of the generic base grammar network to a plurality of additional expanded-symbols.

15. The update observation probability procedure of claim 12 in which the probability of speech is included in the extended recognition paths for each of the models corresponding to expanded-symbols on the recognition paths.

* * * * *